May 24, 1955     V. O. HAUSWIRTH     2,708,817
SPIKE TOOTH FOR HARROWS
Filed Aug. 23, 1951
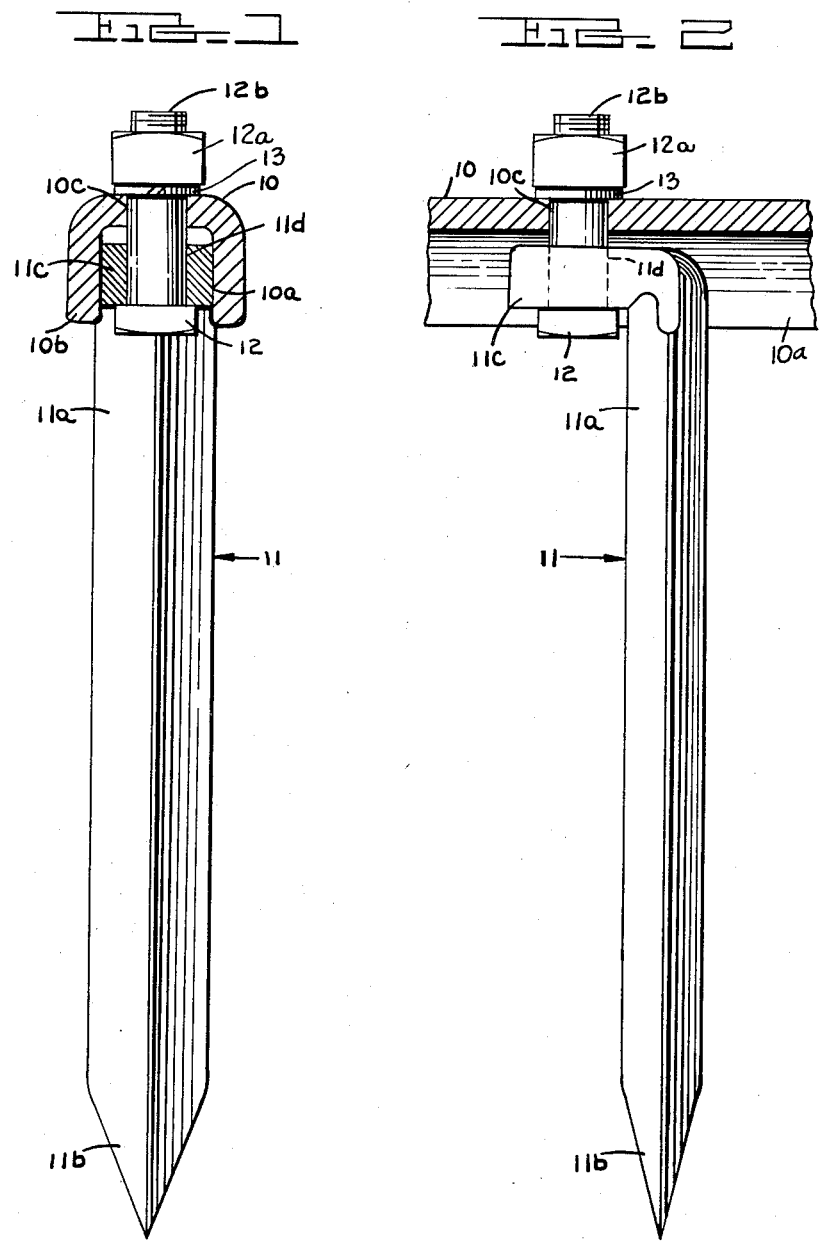
INVENTOR.
VERNON O. HAUSWIRTH
BY
ATTORNEY

United States Patent Office 2,708,817
Patented May 24, 1955

2,708,817
SPIKE TOOTH FOR HARROWS

Vernon O. Hauswirth, Royal Oak, Mich., assignor, by mesne assignments, to Ford Motor Company, Dearborn, Mich., a corporation of Delaware Application August 23, 1951, Serial No. 243,210

1 Claim. (Cl. 55—94)

This invention relates to an improved spike tooth for spike tooth harrows.

The spike tooth harrow has long been a favorite implement for preparing the plowed soil for seeding. The spike tooth harrow commonly has a plurality of ground working teeth mounted on a supporting frame in staggered relationship. Unfortunately, however, all of the soils in which spike tooth harrows are used are not entirely free from rocks and other obstructions. Such objects in the soil frequently inflict damage to such teeth or loosen the teeth mountings. Due to the nature of the teeth and the manner of mounting the teeth on the well-known types of spike tooth harrows, the teeth were frequently broken or loosened.

It is, therefore, an object of this invention to provide an improved spike tooth for a spike tooth harrow which substantially reduces the possibility of breakage or loosening of the spike tooth when working the soil.

Another object of this invention is to provide an improved ground working element for a spike tooth harrow which is securely locked to the harrow.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a rear view of the spike tooth harrow tooth constructed in accordance with this invention and shown secured to a tooth bar of a harrow.

Figure 2 is a side view of Figure 1.

As shown on the drawings:

In Figure 1 there is shown a tooth bar 10 of a spike tooth harrow. Tooth bar 10 is of conventional construction and comprises a generally U-shaped or channel-shaped member. The tooth bar 10 is normally disposed transversely of the spike tooth harrow and the longitudinal groove 10a defined by the sides 10b of the channel-shaped tooth bar 10 opens downwardly. A spike tooth 11 has a shank portion 11a of substantially diamond-shaped cross section as is common to most spike harrow teeth. The shank portion 11a terminates at its lower end in a point 11b which penetrates the soil in a well-known manner. The upper end of shank portion 11a is bent at right angles thereto to form an arm 11c which is thus horizontally disposed relative to tooth bar 10. Arm portion 11c is shaped to conform to and snugly fit against the inner walls of the channel-shaped tooth bar 10 as best shown in Figure 1. The side surfaces of arm portion 11c, which respectively contact the inner walls of groove 10a, are preferably formed parallel to, and in substantial alignment with, two opposed corners of diamond shaped spike tooth 11, and thus serve to position such corners in forward and trailing relationship respectively to the direction of movement of the harrow. A vertical hole 11d is provided in the bent end portion 11c and a plurality of vertical holes 10c are provided in the bight portion of tooth bar 10 in longitudinally spaced relationship. A bolt 12 insertable through the vertical hole 11d in the bent end portion 11c of tooth 11 and through a selected hole 10c in tooth bar 10, plus nut 12a and lock washer 13, secure tooth 11 to such tooth bar and wedges the bent upper portion of tooth 11 tightly against the arcuate corners of groove 10a.

Obviously, a plurality of teeth 11 are secured to the tooth bar 10 in spaced relation to complete the assembly.

From the above description, it is clearly apparent that there is here provided an improved spike tooth construction which is simply and securely locked to the tooth bar of a spike tooth harrow. The bent end portion of the tooth is securely wedged against the sides of the tooth bar by the bolt fastener thereby eliminating any side play of the tooth. The snugly fitting bent end of the spike tooth likewise prevents movement of the tooth in a fore and aft direction. This improved tooth construction will also effect substantial savings in manufacturing costs.

It will, of course, be understood that various details of construction may be varied through a wide range without departing from the principles of this invention and it is, therefore, not the purpose to limit the patent granted hereon otherwise than necessitated by the scope of the appended claim.

I claim:

A spike tooth for a spike tooth harrow having a horizontal transverse tooth bar provided with a downwardly opening transversely extending groove comprising, a vertical shank portion of diamond shaped cross sectional configuration, a substantially horizontal arm member integrally formed on the upper end of said shank portion, said arm member being shaped to snugly fit within the groove and to position said shank portion with two opposed corners thereof respectively disposed in projecting and trailing relationship to the direction of travel of the harrow, and a bolt vertically traversing said arm member and the tooth bar whereby said arm portion is removably secured within the groove.

References Cited in the file of this patent
UNITED STATES PATENTS

| | | |
|---|---|---|
| 776,394 | Haworth | Nov. 29, 1904 |
| 897,645 | McLean | Sept. 1, 1908 |
| 1,108,909 | Keller | Sept. 1, 1914 |
| 1,802,385 | Kisinger | Apr. 28, 1931 |
| 2,208,835 | Donovan | July 23, 1940 |
| 2,259,890 | Hipple | Oct. 21, 1941 |

FOREIGN PATENTS

| | | |
|---|---|---|
| 583,613 | Great Britain | Dec. 23, 1946 |